Oct. 22, 1968 G. W. BROWN 3,406,428
MOLD CONSTRUCTION FOR DIFFERENTIAL PRESSURE
PLASTIC MOLDING MACHINES
Filed April 11, 1966 4 Sheets-Sheet 1

INVENTOR.
GAYLORD W. BROWN
BY
Learman & McCulloch
ATTORNEYS

Oct. 22, 1968

G. W. BROWN 3,406,428

MOLD CONSTRUCTION FOR DIFFERENTIAL PRESSURE
PLASTIC MOLDING MACHINES

Filed April 11, 1966

INVENTOR.
GAYLORD W. BROWN
BY
*Learman & McCulloch*

ATTORNEYS

Oct. 22, 1968   G. W. BROWN   3,406,428
MOLD CONSTRUCTION FOR DIFFERENTIAL PRESSURE
PLASTIC MOLDING MACHINES
Filed April 11, 1966   4 Sheets-Sheet 3

INVENTOR.
GAYLORD W. BROWN
BY   *Learman & McCulloch*

ATTORNEYS

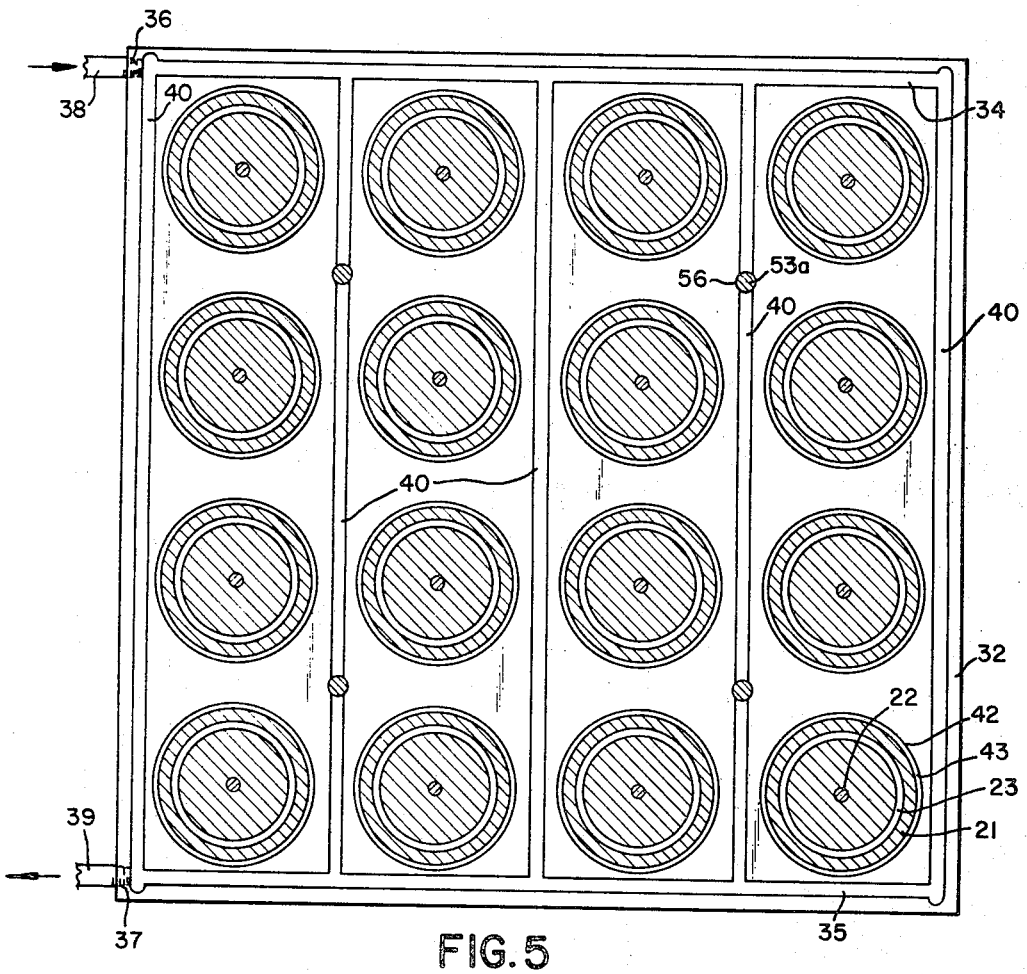
FIG. 5
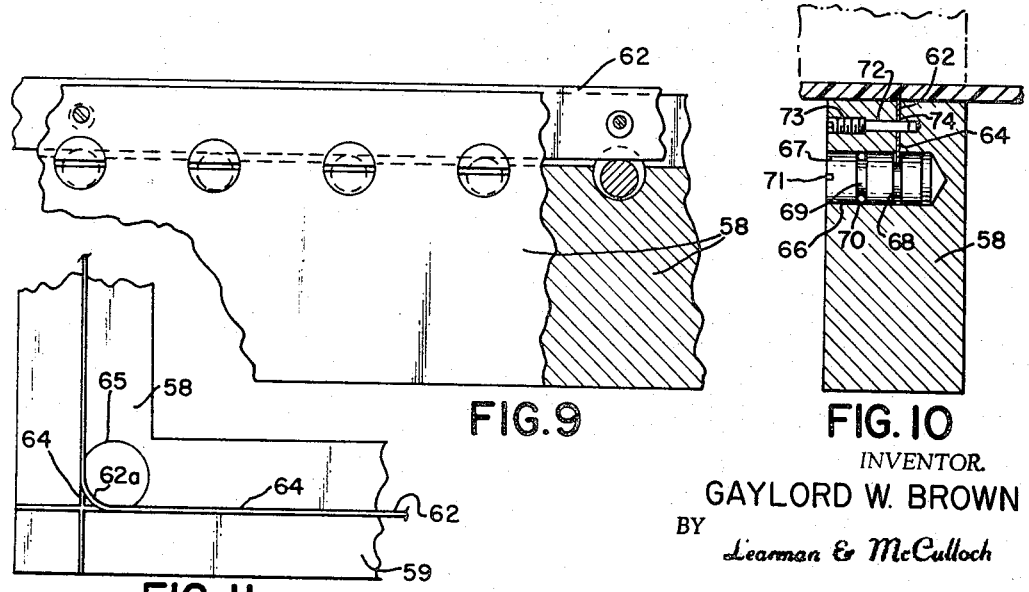
FIG. 9
FIG. 10
FIG. 11
INVENTOR.
GAYLORD W. BROWN
BY
Learman & McCulloch
ATTORNEYS United States Patent Office 3,406,428
Patented Oct. 22, 1968

3,406,428
MOLD CONSTRUCTION FOR DIFFERENTIAL
PRESSURE PLASTIC MOLDING MACHINES
Gaylord W. Brown, Beaverton, Mich., assignor to Brown
Machine Company of Michigan, Inc., Beaverton, Mich.,
a corporation of Michigan
Filed Apr. 11, 1966, Ser. No. 541,589
15 Claims. (Cl. 18—19)

This invention relates to the fabrication of plastic products from thermoplastic sheet material in differential pressure molding machines, and more particularly to certain new and useful improvements in the mold box assemblies which are used in such machines. Typical molding machines which can be used to simultaneously form a plurality of shaped articles in a web of heated, thermoplastic material are disclosed in patents such as United States Patent No. 2,967,328, for example, wherein internal coolant circulating pipes are provided in passages in the walls of the holding blocks which hold the female mold to continuously remove heat from the mold blocks. In the patent mentioned, the internal pipe coils are helically provided in the blocks surrounding the female molds and do not circulate coolant directly to the female molds.

One of the prime objects of the present invention is to design a mold assembly which can be economically and efficiently formed of aluminum stock.

A further object of the invention is to design an evenly cooled mold assembly for high speed machines which does not employ coolant tubing.

Another object of the invention is to design a mold assembly comprising parts in which a network of coolant passages may be easily machined and which then may be secured in assembled form by high strength adhesives.

A further object of the invention is to design a mold construction in which separate coolant circulating systems are efficiently provided for the mold cavities and a stripper member so that the stripper member may be maintained at a different temperature when necessary to achieve the desired temperature balance.

Still another object of the invention is to design a mold assembly including a novel adjustable seal for sealing to the plastic web which need not be replaced continually to keep the molding machine in operating condition.

Other objects and advantages of the invention will be pointed out specifically or will become apparent from the following description when it is considered in conjunction with the appended claims and the accompanying drawings, in which:

FIGURE 5 is a sectional plan view taken on the line 5—5 of FIGURE 2;

FIGURE 9 is an enlarged, fragmentary view of the inner side of one of the plug box rails;

FIGURE 10 is a transverse, sectional view thereof; and

FIGURE 11 is a fragmentary, top plan view of a corner portion of the plug box assembly.

Referring now more particularly to the accompanying drawings, the mold assembly comprises an upper female mold box generally designated 10 and a lower plug box generally designated 11. Both the upper and lower mold boxes 10 and 11 may be connected with air cylinders (not shown) for raising and lowering them in the manner indicated in applicant's assignee's copending application Ser. No. 293,959, filed July 10, 1963, now Patent No. 3,346,923, which illustrates a typical machine with which my novel mold construction may be used.

Figure 1:
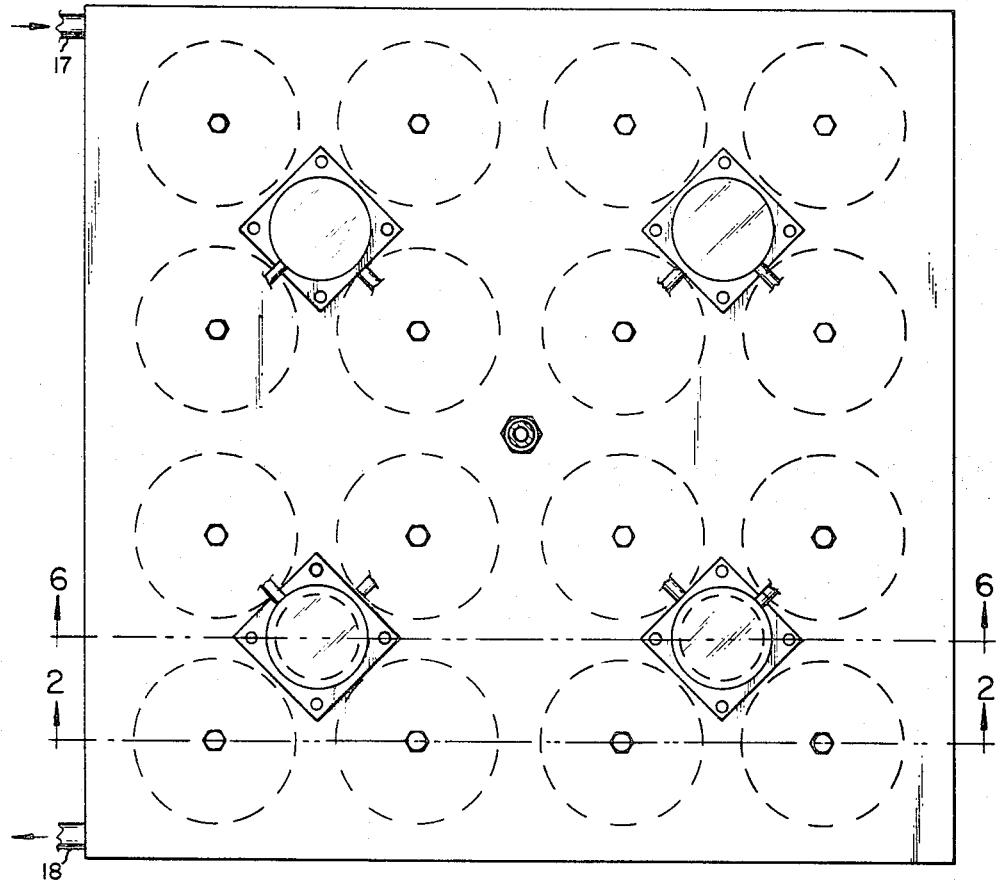
FIGURE 1 is a top plan view of the mold assembly.
Figure 2:
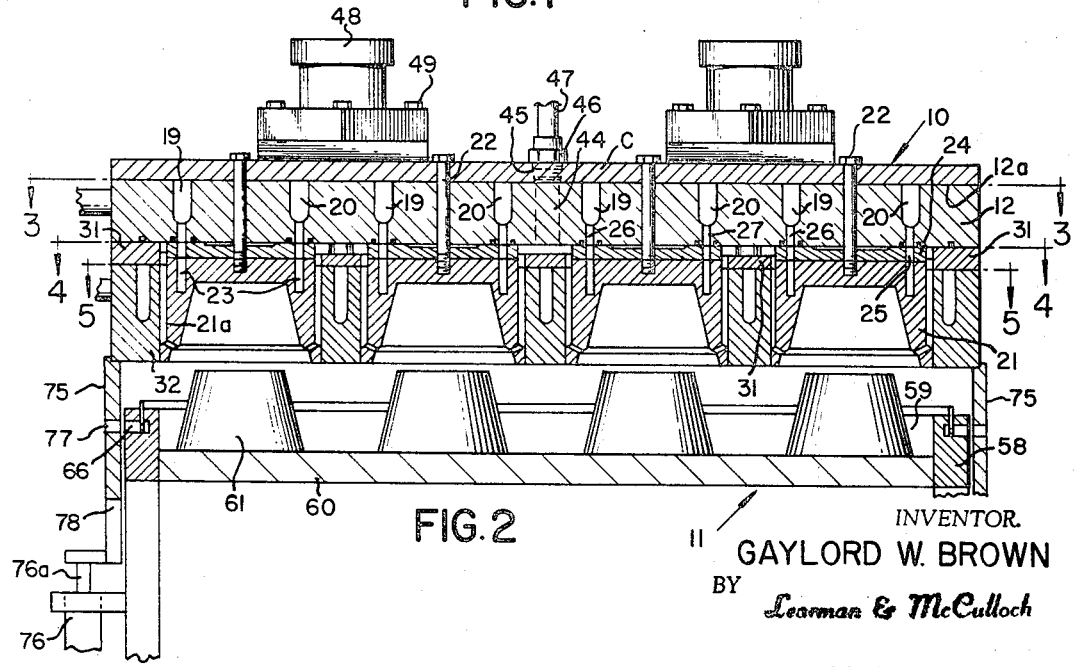
FIGURE 2 is a transverse sectional view taken on the line 2—2 of FIGURE 1 and showing the assembly at a time when the clamp frame engages the upper mold, the plastic web clamped between them being omitted in the interests of clarity.
Figure 3:
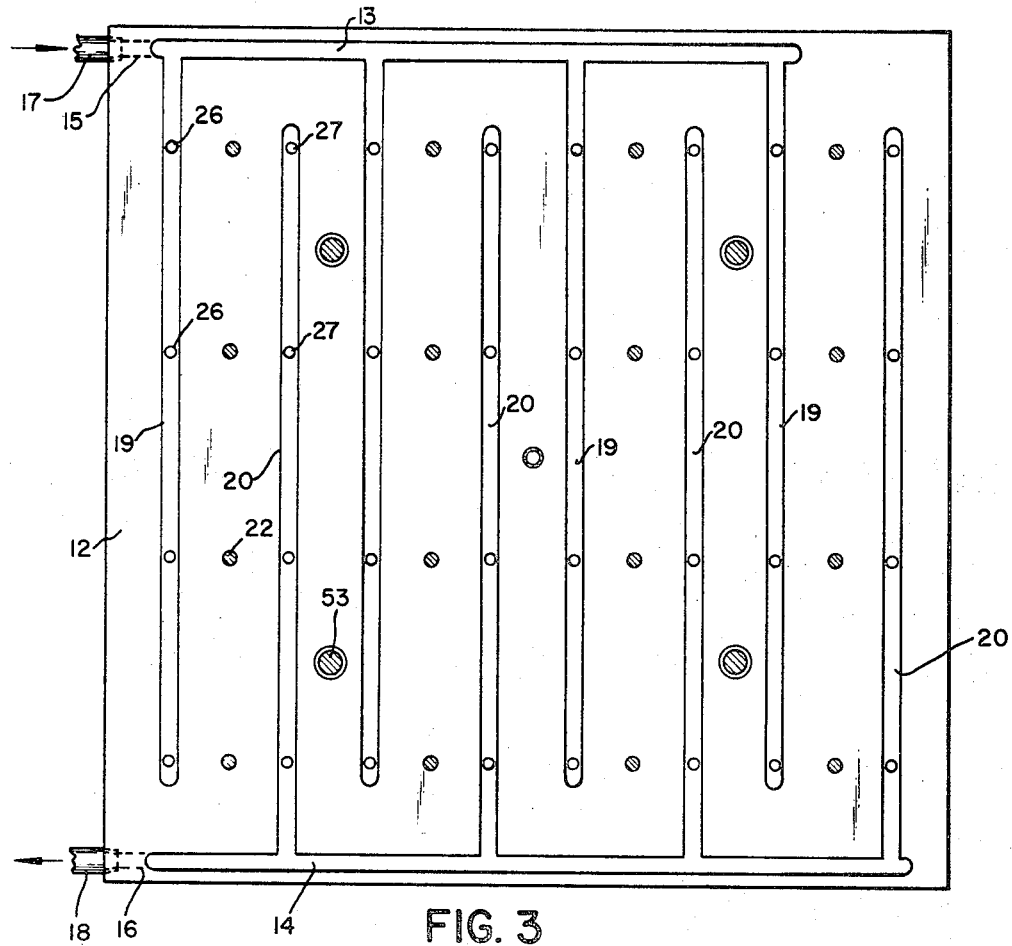
FIGURE 3 is a top plan view of the female mold support plate taken on the line 3—3 of FIGURE 2.

As shown particularly in FIGURES 2 and 3, the female mold box assembly 10 includes a support plate 12, which presents a flat upper surface 12a in which, on opposite sides, supply and discharge manifold passages 13 and 14, respectively, are provided which respectively connect through ports 15 and 16 with a flexible coolant supply pipe 17 and a flexible coolant discharge pipe 18. Cross passages 19 are formed in the surface 12a in communication with the intake manifold passage 13, and cross passages 20 alternate therewith and connect with the discharge manifold line 14. As will later appear, the plate 12 is formed of premachined aluminum tooling plate and a high strength adhesive is used to secure a flat aluminum cover plate C to the plate 12 as at 12b (see FIGURE 7).

As will readily become apparent, the disposition of the supply branch lines 19 and the discharge branch lines 20 is such that they are in a position to supply and remove coolant from the female mold blocks 21 which are supported below the plate 12 by the bolts 22, there being annular grooves 23 provided in the female mold cavity blocks 21 which communicate with the lines 19 and 20 in a manner which will be described. Sandwiched between the female mold cavity blocks 21 and the plate 12 are annular back plates 24, as shown, which have ports 25 and 25a (see FIGURE 4 particularly) connecting the passages 23 with the lines 19 and 20 through the ports 26 and 27 (see FIGURE 3), respectively. O-rings 28 (see FIGURES 7 and 8) provided in annular grooves 29 in the plate 12 surrounding the openings 26 and 27 are provided to seal the ports 26 and 27 in the manner indicated against coolant leakage and a rectangular O-ring 30 disposed in a continuous, rectangular groove 30a which extends around the periphery of the plate 10 provides a vacuum seal between the plate 12 and a stripper plate assembly generally designated S.

Figure 4:
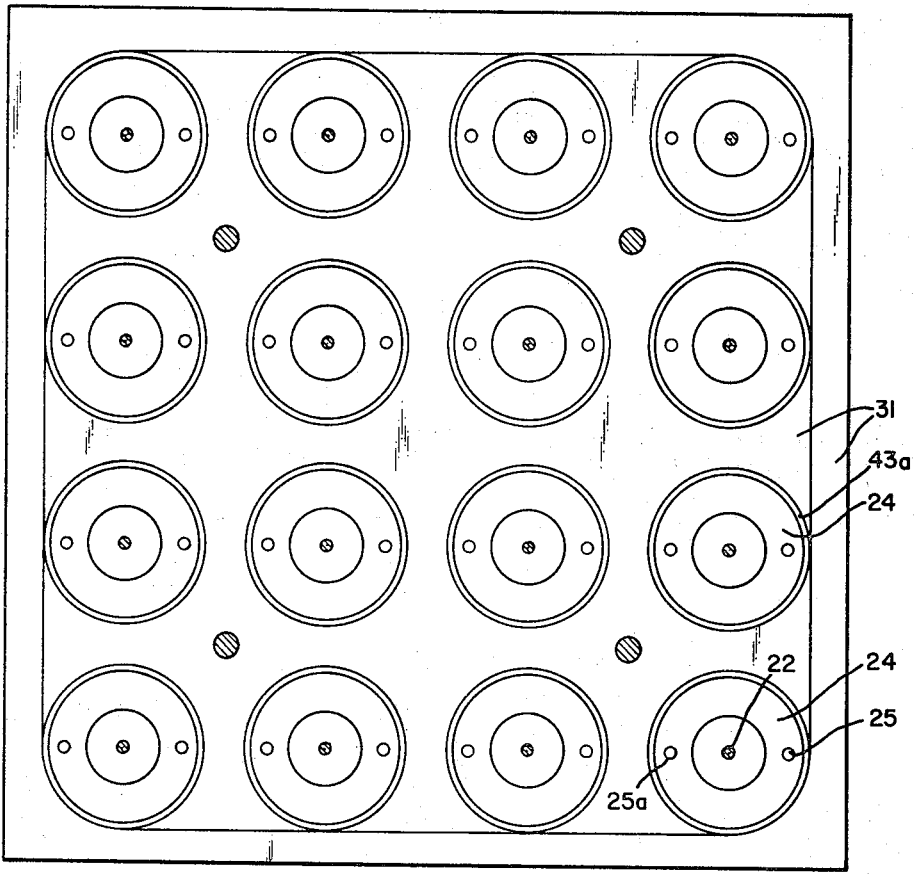
FIGURE 4 is a top plan view taken on the line 4—4 of FIGURE 2.
Figure 7:
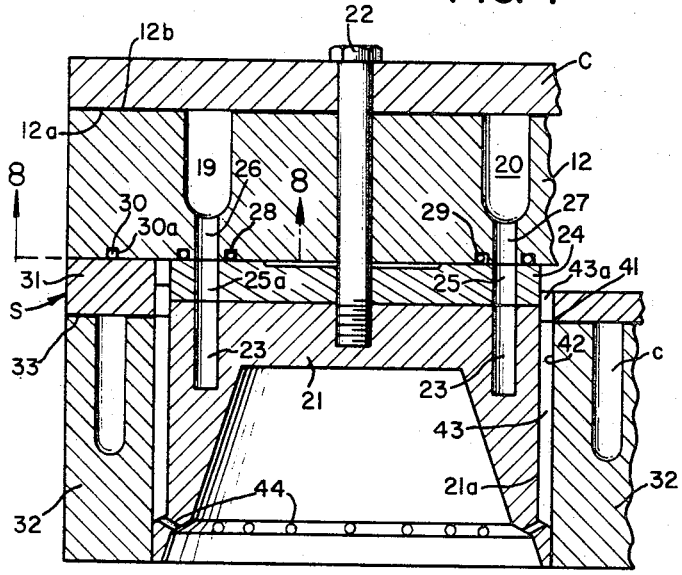
FIGURE 7 is an enlarged, fragmentary, cross-sectional view of a portion of the female mold assembly.
Figure 8:
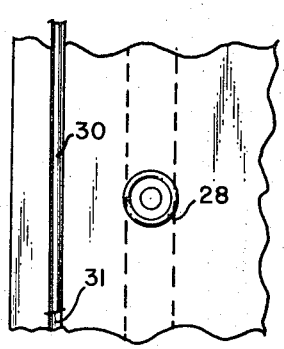
FIGURE 8 is a fragmentary inverse plan view taken on the line 8—8 of FIGURE 7.

As shown particularly in FIGURE 4, the stripper assembly S includes a cover 31 for a stripper plate 32 to which it is adhesively fixed as at 33 (see FIGURE 7). A network of coolant circulating passages are provided in the stripper plate 32, as shown particularly in FIGURE 5. A coolant supply manifold passage 34 and a discharge manifold passage 35 connect via ports 36 and 37, respectively, with a flexible coolant supply tube 38 and a flexible coolant drain tube 39, and these lines 34 and 35 may be connected by cross passages 40.

The aluminum plates 31 and 32 are formed with a series of longitudinally and transversely aligned openings 41 and 42 to receive the individual female molds 21 and, as FIGURE 2 indicates, the upper portions of the molds 21 are reduced in diameter, as at 21a, to form an annular vacuum passage 43 surrounding the molds 21, the passages 43 vertically aligning with the annular passages 43a formed between the cavity base blocks 24 and stripper upper member 31. Ports 44 provided in each female mold block 21 connect with the passages 43 and 43a and through these annular passages with a central vacuum passage 44 provided through the support plate 12. Provided in the cover plate C for the mold support plate 12 is a threaded passage 45 for receiving the end fitting 46 of a flexible vacuum tube 47 which leads from a suitable vacuum pump or the like.

As has been explained, the plates 12 and 32 and their cover plates C and 31 are fabricated from premachined aluminum tooling plate which is very flat on each side. The network of passages comprising grooves 13, 14, 19 and 20 in the support plate 12, as shown in FIGURE 4, and the network of passages formed by grooves 34, 35 and 40 in the stripper plate 32, as shown in FIGURE 5, can be relatively easily milled in these respective plates and it is then a relatively simple matter to adhesively secure the plates C and 31 in position over the network of coolant passages thus formed. By the same token, it is relatively easy to cut the annular slots 23 in the cavity blocks 21, and, of course, to drill connecting ports 25 and 25a in the cavity mold base plates 24 and connecting ports 26 and 27 in the plate 12.

The adhesive used to secure the cover plates C and 31 may comprise a commercial thermosetting resinous epoxy adhesive having no volatile components. A suitable adhesive will, when connecting aluminum plates, develop a cured strength in the range of 3000 to 5000 pounds per square inch following curing for about 45 minutes at approximately 240° F.

Thus, it will be seen that the mold described is relatively simple and economical to fabricate and assemble, whereas such molds in the past have been of such design that their fabrication and assembly has been a long, tedious and expensive procedure.

Figure 6:
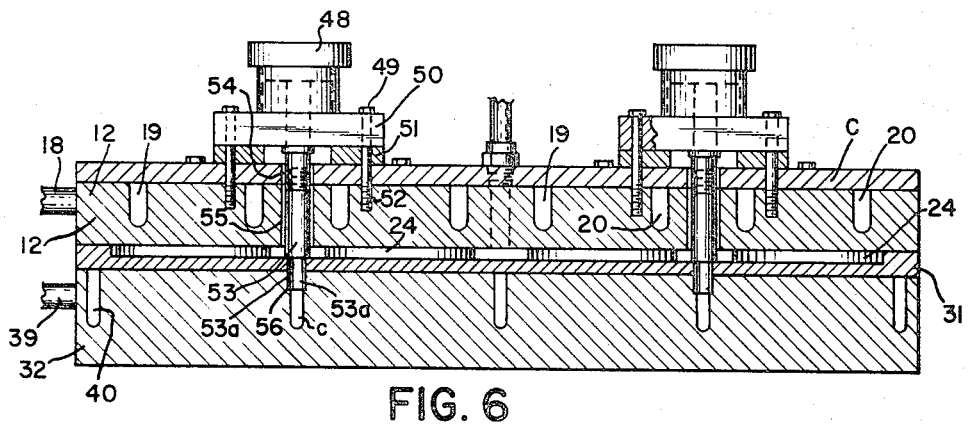
FIGURE 6 is a transverse sectional view taken on the line 6—6 of FIGURE 1.

In order to maintain the stripper plate assembly S in engagement with the plastic web P, when the female mold box 10 and plug box 11 are being withdrawn from the web, double-acting, fluid pressure operated stripper cylinders 48 may be bolted to the cover top plate C as at 49, as shown in FIGURE 6, the bolts 49 extending through the mounting flanges 50 of the cylinders 48 and shim or spacer rings 51 down through the cover plate C and into threaded openings 52 provided in the support plate 12. The piston rods 53 extend down through openings 54 in the cover plates C and 55 in the support plate 12 and have reduced ends 53a which extend into ports 56 in alignment with the slots 40. Since the openings 56 in which the rods 53 may be secured by the same adhesive mentioned or any other suitable adhesive do not extend all the way to the bottom of the slots 40, the connecting passages 40 shown in FIGURE 5 are not blocked. When the mold assembly box 10 is moved upwardly, air under pressure transmitted to the upper end of the cylinders 48 retains the piston rods 53, and accordingly the stripper plate assembly S, in the "down" position, even though cylinders 48 are moving upwardly with the die assembly 10. After a suitable time, air may be supplied to the lower ends of cylinders 48 to raise the piston rods 53 and stripper plate assembly S.

As shown particularly in FIGURES 2 and 9–11, the plug box assembly 11 comprises side rails 58 and end rails 59 surrounding a bottom plate 60 mounting the plugs 61 which are in such position that, when raised, they enter the cavity molds 21 in the usual manner. Whereas previously a rubber gasket has been provided to engage the plastic web and seal the so-called plug or blow box, which, as applicant's aforementioned copending application indicates, may be supplied with air under pressure to assist in forming the plastic, the present invention contemplates the use of a rectangularly shaped perimetral metal seal 62 which does not require continuous replacement as does the rubber gasket which has been in use for some time. The metal seal 62 may comprise a continuous strip of bandsaw stock which is mounted in grooves 63 cut in the upper face of the side and end rails 58 and 59. For ease of formation, blind bores 65 are located and drilled at the juncture of the grooves 64 in the side and end rails 58 and 59 so that the metal seal 62 can, at the corners, follow the curvature of the outer diameter of the bore 65, as at 62a.

Provided in the rails 58 and 59, as shown particularly in FIGURES 9 and 10, in the lower end of the grooves 64 are blind bores 66 receiving rotatable actuating cylinders or plugs 67 which are eccentrically grooved as at 68 to receive the lower edge of the endless metal seal 62. The plugs 67 are also grooved as at 69 to receive O-rings 70 which tend to inhibit inadvertent rotation and are also slotted as at 71 so that they may be readily manipulated with a common screwdriver. Plainly, as the plugs 71 are rotated, the eccentrically grooved portions thereof will raise or lower, as the case may be, to adjust the position of the seal 62. Thus, the metal seal 62 can be adjusted as desired to the relative horizontal position of the stripper ring assembly S and maintain the desired parallelism under high temperature conditions. Generally speaking, the seal 62 will, as set, be adjusted upwardly out of its slot such that when the die assembly 10 is in lowered position and the mold assembly 11 is in raised position the metal seal 62 penetrates about half the thickness of the plastic web P which is disposed between the two mold box assemblies 10 and 11. Because the plugs 71 are provided in relatively closely spaced relation along the rails 58 and 59, minute adjustments of the seal 62 are possible. To prevent the seal 62 form being drawn upwardly out of the slot 64, retaining pins 72 are provided which thread into passages 73 provided in the rails 58 and 59. These pins 72 extend through vertically enlarged openings 74 provided in the seal 62 which permit the desired range of vertical adjustment.

A conventional clamp frame of the character disclosed in the aformentioned pending application is also provided as at 75 to engage the upper mold member 32 and may be operated by pressure fluid cylinders 76 in the manner disclosed in the pending application. Openings 77 provided around the perimeter of clamp frame 75 in alignment with the openings 66 permit access to the adjusting members 67, and brackets 78 may be used to connect the frame 75 with the piston rods 76a of the cylinders 76.

In operation, the metal sealing strip 62 is adjusted by trial and error to the particular mold boxes and the thickness of the plastic web which is to be used in the fabrication. With movement of the boxes 10 and 11 toward the web P the clamp frame 75 will engage the plastic web P at about the same time the female mold box 10 engages the heated plastic web, and when the plastic web P has been engaged between them the plugs 61 engage the web. Shortly thereafter, the suction pump is placed in communication with the cavity box assembly 10, and the heated plastic web which has been partially moved into the cavities by the plugs 61 is drawn into intimate engagement with the mold cavities. The mold box 11 is preferably a pressure box of the character described in the copending application and utilizes air under pressure to supplement the vacuum forces, Thereafter, the suction pump is removed from communication with the line 47 which then is opened to atmosphere to relieve the vacuum condition, and the mold boxes 10 and 11 are moved vertically simultaneously in opposite directions. At the same time, air is admitted to the cylinders 48 so that the stripper assembly S remains in engagement with the plastic web. The coolant circulating in the plate 12 and the stripper plate 32 is preferably water.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. A mold construction comprising: first plate means; second plate means presenting a surface on one side secured to said first plate means; a network of connected coolant passages open to said surface formed in said surface and covered by said first plate means; coolant supply means for circulating a coolant through said network; female mold means connected with the opposite side of said second plate means; and passage means formed in said second plate means and female mold means extending from said network to said female mold means.

2. The combination defined in claim 1 in which said female mold means comprises a plurality of individual female mold cavities in rows and said network includes lines extending on opposite sides of said cavities.

3. The combination defined in claim 2 in which said network includes an intake manifold passage on one side and a discharge manifold passage opposite it, the said passages connecting alternately with said intake passage and discharge passage.

4. The combination defined in claim 1 in which said female mold means comprises a plurality of individual cavity blocks and a stripper plate assembly have openings therein receiving said blocks; the cavity blocks have inner portions of reduced diameter forming vacuum passages around said blocks and ports leading through said blocks to the cavities therein; and vacuum line means connecting with said vacuum passages.

5. The combination defined in claim 4 in which said stripper plate assembly comprises a first plate presenting a surface on one side and a cover plate therefor adhesively secured thereto; the first plate having a network of coolant circulating passages formed therein which open to said surface; and coolant supply and drain means connected with said network of passages in said first plate.

6. The combination defined in claim 1 in which the first plate means is adhesively secured to the second plate means.

7. The combination defined in claim 1 in which stripper plate means has opening means receiving said mold means and fluid pressure actuated stripper cylinders are mounted on the first plate means and have piston rods extending down through said second plate means to connect with said stripper plate means.

8. The combination defined in claim 1 in which said female mold means comprises a plurality of female mold blocks in rows and presenting surfaces on one side having annular passages surrounding the cavity in each block and open to said surfaces; mold backer plates between each block and second plate means; and said passage means comprises intake and exit ports in said second plate means and backer plates connecting said network with the annular passages.

9. The combination defined in claim 1 in which said mold construction includes mold means opposite said female mold means between which and said female mold means a plastic web is secured; projecting seal means carried by one of said mold means on the edge thereof to engage said web; and rotatable members having eccentric grooves mounting said seal means and adjustable to vary the projection of said seal means.

10. A mold construction comprising: female mold means; opposite mold means; means for relatively moving said mold means to clamp a plastic web therebetween; projecting perimetral seal means carried by one of said mold means to engage said web; and means mounting said seal means on said mold means for varying the projection thereof.

11. The combination defined in claim 10 in which said seal means comprises an endless metal strip and said one mold means has a slot means facing the other mold means in which said strip is disposed; said means mounting said seal means comprising rotatable plugs mounted to rotate on an axis transverse to said slot means and situated at spaced intervals around the perimeter of said one mold means; said plugs being eccentrically grooved so that said grooves underlie said slot means, and the eccentric grooves receiving said strip so that rotation of the plugs varies the projection of said strip; and means preventing said strip from being moved entirely out of said slot means.

12. A mold construction comprising: support plate means; a network of connected coolant passages including an intake manifold portion and a discharge manifold portion in said support plate means; coolant supply means connected to said intake manifold portion and coolant discharge means connected to the discharge manifold portion; rows of female mold cavities supported by said support plate means; coolant supply branch line means leading from said intake manifold portion to extend along one side of each of said cavity means alternating with coolant discharge branch line means leading to said discharge manifold portion and extending along the opposite side of each row of cavities; and passage means in said female mold means receiving coolant from said supply branch line means and delivering it to said discharge branch line means.

13. A mold construction comprising: support plate means; circulant passage means in said support plate means including an intake portion and an exit portion; female mold block means having cavity means therein connected with said support plate means; and passage means formed in said support plate means and female mold block means extending from said intake portion into said female mold block means and back to said exit portion.

14. The combination defined in claim 13 in which a stripper plate means surrounds said female mold block means; and passage means is provided therein for a circulant which may be at a different temperature than the circulant in said passage means in the support plate means and female mold block means.

15. The combination defined in claim 13 in which said female mold block means have annular passages surrounding them and ports connecting said annular passages with the cavity means; and means for connecting said annular passages with a vacuum source.

References Cited

UNITED STATES PATENTS

| | | |
|---|---|---|
| 993,970 | 5/1911 | Droitcom. |
| 1,357,343 | 11/1920 | Novotny. |
| 2,590,221 | 3/1952 | Stevens. |
| 2,916,771 | 12/1959 | Lang et al. |
| 2,967,328 | 1/1961 | Shelby et al. |
| 3,225,126 | 12/1965 | Bridges. |
| 3,341,895 | 9/1967 | Shelby. |

FOREIGN PATENTS

| | | |
|---|---|---|
| 1,109,873 | 6/1961 | Germany. |
| 226,092 | 12/1924 | Great Britain. |

J. HOWARD FLINT, JR., *Primary Examiner.*